(12) United States Patent
Funaoka et al.

(10) Patent No.: US 12,460,030 B2
(45) Date of Patent: Nov. 4, 2025

(54) COPOLYMER

(71) Applicant: DAIKIN INDUSTRIES, LTD., Osaka (JP)

(72) Inventors: Tatsuya Funaoka, Osaka (JP); Ryouichi Yano, Osaka (JP); Manabu Fujisawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 645 days.

(21) Appl. No.: 17/879,922

(22) Filed: Aug. 3, 2022

(65) Prior Publication Data

US 2023/0031459 A1 Feb. 2, 2023

Related U.S. Application Data

(63) Continuation of application No. PCT/JP2021/004181, filed on Feb. 4, 2021.

(30) Foreign Application Priority Data

Feb. 7, 2020 (JP) ................................. 2020-019810

(51) Int. Cl.
*C08F 214/26* (2006.01)

(52) U.S. Cl.
CPC ................ *C08F 214/265* (2013.01)

(58) Field of Classification Search
USPC ........................................................ 526/254
See application file for complete search history.

(56) References Cited

U.S. PATENT DOCUMENTS

| | | | |
|---|---|---|---|
| 3,817,951 | A | 6/1974 | Robinson |
| 4,935,467 | A | 6/1990 | Cheng et al. |
| 6,034,170 | A | 3/2000 | Tuminello et al. |
| 6,048,940 | A | 4/2000 | Blädel et al. |
| 6,372,870 | B1 | 4/2002 | Kitahara et al. |
| 6,455,658 | B1 | 9/2002 | Okanishi et al. |
| 6,673,454 | B1 | 1/2004 | Tsuda et al. |
| 2002/0128412 | A1 | 9/2002 | Kitahara et al. |
| 2012/0020637 | A1 | 1/2012 | Maeda et al. |

FOREIGN PATENT DOCUMENTS

| | | |
|---|---|---|
| CA | 2157050 A1 | 9/1994 |
| CA | 2147045 A1 | 10/1995 |
| CN | 1112132 A | 11/1995 |
| CN | 1261379 A | 7/2000 |
| EP | 0 092 675 A1 | 11/1983 |
| EP | 4 032 430 A1 | 7/2022 |
| JP | 49-24295 A | 3/1974 |
| JP | 49-098488 A | 9/1974 |
| JP | 59-33313 A | 2/1984 |
| JP | 59-41351 A | 3/1984 |
| JP | 1-502676 A | 9/1989 |
| JP | 8-41131 A | 2/1996 |
| JP | 8-507876 A | 8/1996 |
| JP | 2000-26767 A | 1/2000 |
| JP | 2000-507293 A | 6/2000 |
| JP | 2001-74944 A | 3/2001 |
| JP | 3428026 B2 | 7/2003 |
| JP | 2006-111885 A | 4/2006 |
| JP | 2010-101932 A | 5/2010 |
| JP | 2010-237414 A | 10/2010 |
| WO | 98/10000 A1 | 3/1998 |
| WO | WO 2021/054363 A1 * | 3/2021 ............ C08F 210/02 |

OTHER PUBLICATIONS

International Search Report issued Mar. 23, 2021 in International Application No. PCT/JP2021/004181.
International Preliminary Report on Patentability with the translation of Written Opinion dated Jul. 28, 2022 from the International Bureau in International Application No. PCT/JP2021/004181.
Extended European Search Report dated Feb. 14, 2024 in European Application No. 21750745.8.

* cited by examiner

*Primary Examiner* — Fred M Teskin
(74) *Attorney, Agent, or Firm* — Sughrue Mion, PLLC

(57) ABSTRACT

Provided is a copolymer consisting essentially of ethylene units, tetrafluoroethylene units, and hexafluoropropylene units, wherein a molar ratio (Et units/TFE units) of the ethylene (Et) units to the tetrafluoroethylene (TFE) units is 52.0/48.0 to 56.0/44.0, and a content of the hexafluoropropylene units is 19.0 to 21.0 mol % based on the total monomer units constituting the copolymer.

6 Claims, No Drawings

COPOLYMER

CROSS-REFERENCE TO RELATED APPLICATIONS

This application is a Rule 53(b) Continuation of International Application No. PCT/JP2021/004181 filed Feb. 4, 2021, which claims priority based on Japanese Patent Application No. 2020-019810 filed Feb. 7, 2020, the respective disclosures of which are incorporated herein by reference in their entirety.

TECHNICAL FIELD

The present disclosure relates to a copolymer.

BACKGROUND ART

An ethylene/tetrafluoroethylene copolymer (ETFE) is one of fluororesins excellent in mechanical strength, heat resistance, and weather resistance.

Patent Document 1 describes a fluorine-containing copolymer comprising ethylene, tetrafluoroethylene, a fluorovinyl compound represented by the formula: $CH_2=CFRf$, wherein Rf represents a fluoroalkyl group having 2 to 10 carbon atoms, and hexafluoropropylene, in which a molar ratio of the tetrafluoroethylene to the ethylene is 40:60 to 90:10, a content of the above fluorovinyl compound is 0.1 to 10 mol % based on the whole copolymer, and a content of the hexafluoropropylene is 0.1 to 30 mol % based on the whole copolymer.

CITATION LIST

Patent Literature

Patent Literature 1: International Publication No. WO1998/010000

SUMMARY

According to the present disclosure, provided is a copolymer consisting essentially of ethylene units, tetrafluoroethylene units, and hexafluoropropylene units, wherein a molar ratio (Ft units/TFE units) of the ethylene (Et) units to the tetrafluoroethylene (TFE) units is 52.0/48.0 to 56.0/44.0, and a content of the hexafluoropropylene units is 19.0 to 21.0 mol % based on the total monomer units constituting the copolymer.

Effects

According to the present disclosure, it is possible to provide a copolymer that can easily provide a molded article having desired dimensions and shape and that can provide a molded article having low haze value and yellow index and a high tensile modulus of elasticity.

DESCRIPTION OF EMBODIMENTS

Hereinafter, specific embodiments of the present disclosure will be described in more detail, but the present disclosure is not intended to be limited to the embodiments as follows.

A copolymer of the present disclosure consists essentially of ethylene (Et) units, tetrafluoroethylene (TFE) units, and hexafluoropropylene (HFP) units.

In the copolymer of the present disclosure, a molar ratio (Et units/TFE units) of the Et units to the TFE units is in a range of 52.0/48.0 to 56.0/44.0. When the molar ratio (Et units/TFE units) is too high, a molded article having a low yellow index value cannot be obtained without spoiling excellent moldability, and when the molar ratio (Et units/TFE units) is too low, a molded article having a low haze value and a high tensile modulus of elasticity cannot be obtained without spoiling the excellent moldability.

The molar ratio (Et units/TFE units) is preferably 52.4/47.6 or more, more preferably 53.0/47.0 or more, even more preferably 54.0/46.0 or more, and preferably 55.8/44.2 or less, more preferably 55.6/44.4 or less, since the molded article having desired dimensions and shape can be even more easily obtained and the molded article having even lower haze value and yellow index and even higher tensile modulus of elasticity can be obtained.

A content of the HFP units in the copolymer of the present disclosure is 19.0 to 21.0 mol % based on the total monomer units constituting the copolymer. When the content of the HFP units is too high, the molded article having the high tensile modulus of elasticity cannot be obtained without spoiling the excellent moldability, and when the content of the HFP units is too small, the molded article having the low haze value cannot be obtained without spoiling the excellent moldability.

The content of the HFP units in the copolymer of the present disclosure is preferably 19.2 mol % or more, more preferably 19.4 mol % or more, even more preferably 19.6 mol % or more, and preferably 20.8 mol % or less, more preferably 20.6 mol % or less, since the molded article having the desired dimensions and shape can be even more easily obtained and the molded article having even lower haze value and yellow index and even higher tensile modulus of elasticity can be obtained.

Since the copolymer of the present disclosure consists essentially of the Et units, the TFE units, and the HFP units, and contents of these 3 types of monomer units are appropriately adjusted, by using the copolymer of the present disclosure as a molding material, the molded article having the desired dimensions and shape can be easily obtained and the molded article having the low haze value and yellow index and the high tensile modulus of elasticity can be obtained. Particularly, the copolymer of the present disclosure is suitable as a copolymer for extrusion, a copolymer for blow molding, etc.

When a conventional copolymer is molded by extrusion, an extrudate (a molded article), immediately after extruded from an extruder, in a melted state prior to cooling and hardening, is very easily deformed. Accordingly, in a process that the molded article in the melted state is cooled and hardened, the molded article stretches to become thin or bends, thereby not easy to obtain the molded article having the desired dimensions and shape. For example, when the conventional copolymer is extruded from the extruder and the extrudate is cut by a cutter to produce pellets, if the extrudate is easily deformed, the pellets with the same dimensions and shape may not be obtained due to large deformation during cutting. Furthermore, the molded article after cooling and hardening also has problems such as turbidity or coloring observed or being too soft and easily deformed.

On the other hand, for example, when the copolymer of the present disclosure is extruded, the extrudate immediately after extruded from the extruder is also excellent in dimension stability and shape stability, and therefore the molded article having the desired dimensions and shape can be easily obtained. Furthermore, the molded article obtained has high tensile modulus of elasticity and is less likely to be deformed as well as having the low haze value and yellow index and excellent transparency. Also, from the copolymer of the present disclosure, obtained is the molded article having a large tensile elongation. For example, when the copolymer of the present disclosure is extruded from the extruder and the extrudate is cut by the cutter to produce the pellets, the extrudate is less likely to be deformed in any stage of cutting the extrudate and cooling the extrudate after cutting, and therefore the pellets having the desired dimensions and shape as well as the low haze value and yellow index and the excellent transparency can be obtained.

The copolymer of the present disclosure consists essentially of the Et units, the TFE units, and the HFP units. Accordingly, the copolymer of the present disclosure may contain a small amount (e.g., less than 0.1 mol %, less than 0.05 mol %) of a further monomer unit or not contain the further monomer unit. However, when containing the further monomer unit, its content must be in a range of not spoiling superior effects of the copolymer of the present disclosure. It is also preferable that the copolymer of the present disclosure consists of the Et units, the TFE units, and the HFP units.

A content of each monomer unit in the copolymer of the present disclosure can be calculated by appropriately combining e.g., NMR and elemental analysis, according to types of the monomer units constituting the copolymer.

It is preferable in the copolymer of the present disclosure that a ratio ($\eta_0/\eta_{100}$) of zero-shear viscosity ($\eta_0$ (Pa·s)) to shear viscosity ($\eta_{100}$ (Pa·s)) is 4.0 or more. The ratio ($\eta_0/\eta_{100}$) of 4.0 or more allows melt viscosity of the copolymer to decrease easily when high shear force is applied to the copolymer, facilitating molding as well as suppressing increases of the haze value and the yellow index due to shear heat. On the other hand, in a state that no shear force is applied, the copolymer maintains appropriate melt viscosity, which can prevent the molded article in the melted state immediately after the molding from stretching to become thin or bending in the process of cooling and hardening, thereby making it easy to obtain the molded article having the desired dimensions and shape.

For example, even when the copolymer is blow molded, the ratio ($\eta_0/\eta_{100}$) of 4.0 or more can sufficiently suppress generation of the shear heat when the copolymer is melted in the extruder, thereby suppressing adverse effects due to the shear heat, to obtain the blow molded article having the low haze value and yellow index. Furthermore, since the extrudate (parison) is less likely to be deformed, drawdown can be sufficiently suppressed, to easily obtain the blow molded article having the desired dimensions and shape.

The ratio ($\eta_0/\eta_{100}$) of the copolymer of the present disclosure is more preferably 4.3 or more, even more preferably 4.6 or more, particularly preferably 4.9 or more, and most preferably 5.2 or more, since the molded article having the desired dimensions and shape can be even more easily obtained. Further, the ratio ($\eta_0/\eta_{100}$) of the copolymer is preferably 7.5 or less, more preferably 6.5 or less, and even more preferably 6.0 or less, since the melt viscosity may be unnecessarily decreased when the high shear force is applied, to become difficult to mold instead.

The shear viscosity ($\eta_{100}$ (Pa·s)) is a shear viscosity of the copolymer measured at a measurement temperature of 270° C. and a shear rate of 100 (1/s). The shear viscosity ($\eta_{100}$ (Pa·s)) can be determined by measuring the shear viscosity of the copolymer using, e.g., a rotating-type rheometer, at a frequency of 100 (rad/s), and converting the frequency (rad/s) into the shear rate ($\gamma$). In the conversion, the frequency (rad/s) and the shear rate ($\gamma$) are equivalent in value according to the Cox-Merz rule.

The zero-shear viscosity ($\eta_0$ (Pa·s)) can be determined by measuring the shear viscosity ($\eta$) of the copolymer for each frequency (rad/s) at a measurement temperature of 270° C., converting the frequency (rad/s) to the shear rate ($\gamma$) in which the frequency (rad/s) and the shear rate ($\gamma$) are equivalent value according to the Cox-Merz rule, and fitting, using Cross-WLF model, a flow curve of the shear viscosity ($\eta$) of the copolymer relative to the shear rate ($\gamma$).

The shear viscosity ($\eta_{100}$ (Pa·s)) of the copolymer of the present disclosure is preferably 100 to 500 Pa·s, more preferably 100 to 450 Pa·s, even more preferably 100 to 400 Pa·s, and particularly preferably 100 to 350 Pa·s.

When the shear viscosity ($\eta_{100}$) of the copolymer becomes high, deformation of the molded article in the melted state can be suppressed, crystallization of the copolymer proceeds at a moderate rate during cooling the molded article in the melted state, and the haze value and yellow index of the molded article after cooling and hardening tend to become low, but melt-extrusion tends to become difficult.

On the other hand, when the shear viscosity ($\eta_{100}$) of the copolymer becomes low, the melt-extrusion tends to become easy, but the molded article immediately after melt-molding and before cooling and hardening tends to be easily deformed, the copolymer tends to rapidly crystallize during cooling the molded article in the melted state, and the haze value and yellow index of the molded article after cooling and hardening tend to become high.

Since the copolymer of the present disclosure consists essentially of the Et units, the TFE units, and the HFP units, and contents of these 3 types of monomer units are appropriately adjusted, even when the shear viscosity ($\eta_{100}$) is low and easy to melt extrude, the molded article which is less likely to be deformed before cooling and hardening, and having the desired dimensions and shape, can be easily obtained and the molded article having the low haze value and yellow index and the high tensile modulus of elasticity can be obtained.

The ratio ($\eta_0/\eta_{100}$) and the shear viscosity ($\eta_{100}$) of the copolymer can be adjusted by appropriately adjusting an amount of a polymerization initiator, a polymerization pressure, a polymerization time, etc., while appropriately adjusting an amount of each monomer used in the polymerization.

A melt flow rate (MFR) of the copolymer of the present disclosure is preferably 1 to 80 g/10 minutes, more preferably 10 g/10 minutes or more, even more preferably 15 g/10 minutes or more, and more preferably 70 g/10 minutes or less, even more preferably 65 g/10 minutes or less, since the molded article having the desired dimensions and shape can be even more easily obtained, and the molded article having even lower haze value and yellow index and even higher tensile modulus of elasticity can be obtained.

The melt flow rate (MFR) can be measured by using a melt indexer in accordance with ASTM D1238. Specifically, it can be measured as a mass (g/10 minutes) of the copolymer flowing out a nozzle having an inner diameter of 2 mm and a length of 8 mm for 10 minutes at a measurement temperature of 265° C. and a load of 5 kg.

A melting point of the copolymer of the present disclosure is preferably 135° C. or less, more preferably 130° C. or less, even more preferably 125° C. or less, particularly preferably 120° C. or less, most preferably 115° C. or less, and preferably 100° C. or more, more preferably 105° C. or more, even more preferably 110° C. or more, since the molded article having the desired dimensions and shape can be even more easily obtained, and the molded article having even lower haze value and yellow index and even higher tensile modulus of elasticity can be obtained. If the melting point of the copolymer of the present disclosure is within the above range, for example, co-extrusion of the copolymer of the present disclosure with a general-purpose resin becomes possible, or the molding by using a general-purpose 3D printer of the copolymer of the present disclosure becomes possible.

The melting point can be measured by using a differential scanning calorimeter in accordance with ASTM D4591. Specifically, by using the differential scanning calorimeter, thermal measurement of the copolymer is performed at a temperature-increasing rate of 10° C./minutes, and a temperature corresponding to a peak of an endothermic curve obtained can be determined as the melting point.

It is also preferable that the copolymer of the present disclosure has the low MFR as well as the low melting point. The copolymer, in which both the melting point and the MFR are low, is superior, in that the molded article having the desired dimensions and shape can be even more easily obtained, and the molded article having even lower haze value and yellow index and even higher tensile modulus of elasticity can be obtained. The copolymer of the present disclosure may be the copolymer having the melting point of 100 to 135° C. and the MFR of 1 to 80 g/10 minutes, the copolymer having the melting point of 100 to 130° C. and the MFR of 10 to 70 g/10 minutes, or the copolymer having the melting point of 100 to 125° C. and the MFR of 10 to 65 g/10 minutes.

The tensile modulus of elasticity of the copolymer of the present disclosure is preferably 250 MPa or more, more preferably 300 MPa or more, even more preferably 350 MPa or more, particularly preferably 400 MPa or more, and preferably 600 MPa or less, more preferably 550 MPa or less, even more preferably 500 MPa or less, since the molded article having appropriate shape retention characteristics and flexibility can be obtained.

The tensile modulus of elasticity can be measured by performing a tensile test of the copolymer at 25° C. and a tensile speed of 50 mm/min in accordance with ASTM D1708.

The tensile elongation of the copolymer of the present disclosure is preferably 350% or more, more preferably 440% or more, even more preferably 480% or more, and preferably 700% or less, more preferably 600% or less, even more preferably 500% or less, since the molded article which is difficult to break even when deformed, can be obtained.

The tensile elongation can be measured by performing the tensile test of the copolymer at 25° C. and a tensile speed of 50 mm/min in accordance with ASTM D1708.

The haze value of the copolymer of the present disclosure is preferably 14% or less, more preferably 12% or less, even more preferably 10% or less, and preferably 2% or more, more preferably 4% or more. The haze value of the copolymer can be measured by using a haze meter with respect to a sheet of the copolymer having a thickness of 2.0 mm in accordance with ASTM D1003.

The yellow index (YI) value of the copolymer of the present disclosure is preferably −10 or less, more preferably −12 or less, even more preferably −15 or less, and preferably −40 or more. The yellow index value of the copolymer can be measured by using a color difference meter with respect to the sheet of the copolymer having a thickness of 2.0 mm in accordance with ASTM D1925.

The copolymer of the present disclosure can be produced under the presence of the polymerization initiator by copolymerizing the tetrafluoroethylene, the ethylene, and the hexafluoropropylene so that each monomer unit is within a range of the content described above.

The polymerization may be solution polymerization, bulk polymerization, emulsion polymerization, suspension polymerization, etc., but it is preferably the emulsion polymerization or the suspension polymerization, more preferably the suspension polymerization, in that they are industrially easy to implement.

The polymerization initiator may be an oil-soluble radical polymerization initiator or a water-soluble radical polymerization initiator, but preferable is the oil-soluble radical polymerization initiator.

The oil-soluble radical polymerization initiator may be a known oil-soluble peroxide, and examples typically include:
dialkyl peroxycarbonates such as dinormalpropyl peroxydicarbonate, diisopropyl peroxydicarbonate, di-sec-butyl peroxydicarbonate, and di-2-ethoxyethyl peroxydicarbonate;
peroxyesters such as t-butyl peroxyisobutyrate and t-butyl peroxypivalate;
dialkyl peroxides such as di-t-butyl peroxide; and di[fluoro(or fluorochloro)acyl]peroxides.

Di[fluoro(or fluorochloro)acyl]peroxides include diacyl peroxides represented by [(RfCOO)—]$_2$, wherein Rf is a perfluoroalkyl group, a ω-hydroperfluoroalkyl group, or a fluorochloroalkyl group.

The di[fluoro(or fluorochloro)acyl]peroxides include di(w-hydro-dodecafluorohexanoyl) peroxide, di(ω-hydro-tetradecafluoroheptanoyl) peroxide, di(ω-hydro-hexadecafluorononanoyl) peroxide, di(perfluoropropionyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydro-dodecafluoroheptanoyl-w-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide, di(undecachlorotriacontafluorodocosanoyl) peroxide, etc.

The water-soluble radical polymerization initiator may be a known water-soluble peroxide, and examples include an ammonium salt, a potassium salt, and a sodium salt, such as persulfate, perborate, perchlorate, perphosphate, percarbonate; organic peroxides such as disuccinic acid peroxide and diglutaric acid peroxide; t-butyl permaleate; t-butyl hydroperoxide; etc. A reducing agent such as sulfites may be used in combination with peroxides, and its amount used may be 0.1 to 20 times an amount of the peroxides.

In the copolymerization described above, a surfactant, a chain transfer agent and a solvent can be used, and conventionally known ones may be used.

As the surfactant, known surfactants may be used; for example, a nonionic surfactant, an anionic surfactant, a cationic surfactant may be used. Among them, preferable is a fluorine-containing anionic surfactant, and more preferable is a linear or branched fluorine-containing anionic surfactant having 4 to 20 carbon atoms and optionally containing an ether-bonded oxygen (i.e., optionally having an oxygen atom intercalated between carbon atoms). The amount of the surfactant added (based on the polymerization water) is preferably 50 to 5,000 ppm.

The chain transfer agents include: hydrocarbons such as ethane, isopentane, n-hexane, and cyclohexane; aromatics such as toluene and xylene; ketones such as acetone; acetate esters such as ethyl acetate and butyl acetate; alcohols such as methanol and ethanol; mercaptans such as methyl mercaptan; and halogenated hydrocarbons such as carbon tetrachloride, chloroform, methylene chloride, and methyl chloride. An amount of the chain transfer agent added may be changed depending on magnitude of a chain transfer constant of a compound used, but is usually used in a range of 0.01 to 20 mass % based on a polymerization solvent.

The solvents include water, mixed solvent of water and alcohol, etc.

In the suspension polymerization, a fluorinated solvent in addition to water may be used. The fluorinated solvent includes: hydrochlorofluoroalkanes such as $CH_3CClF_2$, $CH_3CCl_2F$, $CF_3CF_2CCl_2H$, and $CF_2ClCF_2CFHCl$; chlorofluoroalkanes such as $CF_2ClCFClCF_2CF_3$ and $CF_3CFClCFClCF_3$; hydrofluoroalkanes such as $CF_3CFHCFHCF_2CF_2CF_3$, $CF_2HCF_2CF_2CF_2CF_2H$, and $CF_3CF_2CF_2CF_2CF_2CF_2H$; hydrofluoroethers such as $CH_3OC_2F_5$, $CH_3OC_3F_7CF_3CF_2CH_2OCHF_2$, $CF_3CHFCF_2OCH_3$, $CHF_2CF_2OCH_2F$, $(CF_3)_2CHCF_2OCH_3$, $CF_3CF_2CH_2OCH_2CHF_2$, and $CF_3CHFCF_2OCH_2CF_3$; perfluoroalkanes such as perfluorocyclobutane, $CF_3CF_2CF_2CF_3$, $CF_3CF_2CF_2CF_2CF_3$, and $CF_3CF_2CF_2CF_2CF_2CF_3$. Above all, the perfluoroalkanes are preferable. An amount of the fluorinated solvent used is preferably 10 to 100 mass % based on an aqueous medium from aspects of suspension and economy.

A polymerization temperature is not limited, but may be 0 to 100° C. A polymerization pressure is appropriately determined depending on other polymerization conditions such as a type, an amount and a vapor pressure of the solvent used, and the polymerization temperature, but may be normally 0 to 9.8 MPaG.

The copolymer of the present disclosure may be in any form, i.e., in aqueous dispersion, powder, pellets, etc.

The copolymer of the present disclosure can be molded to a variety of molded articles. The molded article obtained has the low haze value and yellow index and the high tensile modulus of elasticity. Also, the copolymer of the present disclosure can be easily molded to the molded article having the desired dimensions and shape.

The shape of the molded article is not limited, and may be a shape such as a hose, a pipe, a tube, a sheet, a seal, a gasket, a packing, a film, a tank, a roller, a bottle, and a container.

A method for molding the copolymer is not limited, and examples include compression molding, extrusion, blow molding, transfer molding, injection molding, rotational molding, rotational lining molding, electrostatic coating, etc. When using the extrusion, the pipe and the tube can be easily produced. The present disclosure includes methods for producing the molded articles, which mold the above copolymer by using the extrusion, the blow molding, etc.

Particularly, the copolymer of the present disclosure can be suitably molded by melt molding, since the melt viscosity is easily reduced by applying the high shear force and appropriate melt viscosity is maintained in a state that the shear force is not applied, and can be even more suitably molded by the melt molding not using a metal mold such as the extrusion and the blow molding.

A molding temperature is preferably the melting point or more of the copolymer, more preferably 180° C. or more, even more preferably 220° C. or more, particularly preferably 240° C. or more, further most preferably 260° C. or more, and preferably 340° C. or less. The copolymer of the present disclosure can easily produce the molded article having the desired dimensions and shape with high productivity, even when melting at a high temperature in this manner.

The copolymer of the present disclosure may be molded after mixing with a filler material, a plasticizing agent, a processing aid, a mold release agent, a pigment, a flame retarder, a lubricant, a light stabilizer, a weather resistant stabilizer, a conductive material, an antistatic agent, an ultraviolet absorbing agent, an antioxidant, a foaming agent, an aroma chemical, oil, a softening agent, a dehydrofluorination agent, etc. The filler materials may include polytetrafluoroethylene, mica, silica, talc, celite, clay, titanium oxide, barium sulfate, etc. The conductive materials may include carbon black etc. The plasticizing agents may include dioctylphtalate, pentaerythritol, etc. The processing aids may include carnauba wax, a sulfone compound, low molecular weight polyethylene, a fluorinated aid, etc. The dehydrofluorination agents may include organic onium, amidines, etc.

Since the molded article obtained from the copolymer of the present disclosure has the low haze value and yellow index and the high tensile modulus of elasticity, it can be suitably used as a transparent tube. The transparent tube is not limited, but may be a transparent tube for flowing various liquids. To give an example, in a liquid product that is required to have excellent aesthetic nature of appearance, e.g., in fragrance products including a liquid fragrance, the copolymer of the present disclosure can be suitably used as the transparent tube etc. for flowing the liquid fragrance.

Further, the copolymer of the present disclosure can be suitably utilized as a molding material for molded articles as follows.

Namely, these molded articles include, for example:
fluid transfer members for a food production apparatus such as a food packaging film, a lining material of a fluid transfer line used in a food production process, a packing, a sealing material, and a sheet;
chemical solution transfer members, such as a plug and a packaging film for chemicals, and a lining material, a packing, a sealing material, and a sheet for a fluid transfer line used in a chemical production process;
inner surface lining members for a chemical solution tank and a piping in a chemical plant and a semiconductor plant;
fuel transfer members such as an O (square)-ring/tube/ packing, a valve core material, a hose, and a sealing material, used for a fuel system and peripheral equipment of automobiles, and a hose and a sealing material used for an AT device of the automobiles;
other automobile members such as, a flange gasket of a carburetor, a shaft seal, a valve stem seal, a sealing material, and a hose, used for engines and the peripheral equipment of the automobiles, and a break hose, an air conditioner hose, a radiator hose of the automobiles, and an electric wire coating material;
chemical solution transfer members for semiconductor production equipment such as an O (square)-ring, a tube, a packing, a valve core material, a hose, a sealing material, a roll, a gasket, a diaphragm, and a joint for the semiconductor production equipment;
painting/ink members such as a painting roll, a hose, a tube, and an ink container, used for painting equipment;

food and drink transfer members, food packaging materials, and glass cooking equipment, such as a tube of a tube for food and drink or a hose for food and drink, a hose, a belt, a packing, and a joint;

waste liquid transportation members such as a tube and a hose for waste liquid transportation;

high temperature liquid transportation members such as a tube and a hose for high temperature liquid transportation;

steam piping members such as a tube and a hose for steam piping;

anti-corrosion tapes for piping such as a tape wrapped around piping on a ship deck, etc.;

various coating materials, such as an electric wire coating material, an optical fiber coating material, and a transparent front side coating material and a back side agent provided on a light incidence side surface of a photovoltaic element for a solar cell;

sliding members such as a diaphragm of a diaphragm pump and various packings;

weather resistance covers, such as agricultural films and various roof materials/side wall materials;

coating materials for glasses such as an interior material used in an architectural field, and a non-flammable fireproof safety glass;

lining materials for a laminated steel plate etc. used in a field of a home appliance etc.;

a riser pipe transporting resources from the sea bottom to the sea surface in an offshore oil field or a gas field; and a coating material and a lining material of an innermost surface and an outermost surface of fluid transporting metal piping for crude oils and natural gases.

The fuel transfer members used for the fuel systems of the automobiles described above, furthermore, include a fuel hose, a filler hose, an evaporator hose, etc. The above fuel transfer member can be used as one for a sour resistant gasoline, alcohol resistant fuel, or fuel containing gasoline additives such as methyl tertiary-butyl ether resistant/amine resistant additives.

The plugs/packaging films for the chemicals described above have excellent chemical resistance against acid and the like. Further, the above chemical solution transfer members may include an anti-corrosion tape wrapped around piping of the chemical plant.

The molded articles described above further include a radiator tank for automobiles, a chemical solution tank, bellows, a spacer, a roller, a gasoline tank, a container for the waste liquid transportation, a container for the high temperature liquid transportation, tanks for fishery/fish farming, etc.

The molded articles described above further include members used for an automobile bumper, a door trim, a gauge board, a food processing apparatus, a cooking appliance, a water- and oil-repellency glass, lightening related equipment, a display panel/housing of QA equipment, an illuminated signboard, a display, a liquid crystal display, a mobile phone, a printed circuit board, an electric/electronic component, a general merchandise, a trash can, a bathtub, a bath module, a ventilating fan, a frame for lightening, etc.

Further, the copolymer of the present disclosure can be a powder coating material composed of the copolymer. Such a powder coating material may have an average particle size of 10 to 500 μm. The average particle size can be measured by using a laser diffraction particle size distribution analyzer. After the powder coating material is sprayed on a substrate by an electrostatic coating, a coating film without a foaming trace can be obtained by sintering.

Embodiments are described above, but it will be appreciated that various modifications of the embodiments and details are possible without departing from the effect and scope of the claims.

According to the present disclosure, provided is a copolymer consisting essentially of ethylene units, tetrafluoroethylene units, and hexafluoropropylene units, wherein a molar ratio (Et units/TFE units) of the ethylene (Et) units to the tetrafluoroethylene (TFE) units is 52.0/48.0 to 56.0/44.0, and a content of the hexafluoropropylene units is 19.0 to 21.0 mol % based on the total monomer units constituting the copolymer.

It is preferable that, in the copolymer of the present disclosure, a ratio ($\eta_0/\eta_{100}$) of zero-shear viscosity ($\eta_0$ (Pa·s)) to shear viscosity ($\eta_{100}$ (Pa·s)) is 4.0 or more, wherein the zero-shear viscosity ($\eta_0$ (Pa·s)) is determined by fitting, using Cross-WLF model, a flow curve of the shear viscosity of the copolymer relative to the shear rate at a measurement temperature of 270° C., and the shear viscosity ($\eta_{100}$ (Pa·s)) represents a shear viscosity of the copolymer at a measurement temperature of 270° C. and a shear rate of 100 (1/s).

It is preferable that, in the copolymer of the present disclosure, the shear viscosity ($\eta_{100}$ (Pa·s)) at a measurement temperature of 270° C. and a shear rate of 100 (1/s) is 100 to 500 Pa·s.

It is preferable that, in the copolymer of the present disclosure, a melt flow rate at a measurement temperature of 265° C. and a load of 5 kg is 1 to 80 g/10 minutes.

It is preferable that, in the copolymer of the present disclosure, a melting point is 135° C. or less.

It is preferable that, in the copolymer of the present disclosure, a tensile modulus of elasticity is 250 MPa or more.

EXAMPLES

Hereinafter, the embodiments of the present disclosure will be described with reference to Examples. However, the present disclosure is not intended to be limited to Examples.

Each datum in Examples was measured by the following method.

<Monomer Formulation of Copolymer>

Using powder of a copolymer and a nuclear magnetic resonance instrument AC300 (produced by Bruker-Biospin), $^{19}$F-NMR measurement was performed at a measurement temperature of (a melting point of the polymer+20)° C., to obtain a monomer formulation of the copolymer from an integrated value of each peak. Also, depending on a type of the monomer, the monomer formulation of the copolymer may be obtained in combination with elemental analysis as appropriate.

<Melt Flow Rate (MFR)>

Using pellets of the copolymer and a melt indexer (produced by Yasuda Seiki Seisakusho, Ltd.), in accordance with ASTM D1238, a mass (g/10 minutes) of the copolymer flowing out of a nozzle having an inner diameter of 2 mm and a length of 8 mm for 10 minutes at 265° C. and a load of 5 kg was obtained as a MFR.

<Melting Point>

Using the powder of the copolymer and a differential scanning calorimeter RDC220 (produced by Seiko Instruments Inc.), in accordance with ASTM D4591, thermal measurement was performed at a temperature-increasing rate of 10° C./minute, and a melting point of the copolymer was determined from a peak of an endothermic curve obtained.

<Shear Viscosity (η)>

The powder or pellets of the copolymer was compressively molded at 280° C., to obtain a sheet-like molded article having a thickness of 1.0 mm. Using the sheet-like molded article obtained and the rotation-type rheometer (MCR302, produced by Anton Paar GmbH), shear viscosity (η) of the copolymer was measured at 16 points by varying a frequency in a range of 0.1 (rad/s) to 100 (rad/s) under the following measurement conditions. Based on the Cox-Merz rule, each frequency (rad/s) was equated with a shear rate (γ). Of the measured values, the shear viscosity ($\eta_{100}$) at the shear rate of 100 (1/s) is shown in Table 1.

Measurement Temperature: 270° C.
Measurement Amount of Strain: 0.1%
Measurement Jig: Parallel Disks of Diameter of 25 mm
Measurement Gap Distance: 0.5 mm Further, the zero-shear viscosity ($\eta_0$ (Pa·s)) was calculated by fitting, using Cross-WLF model, a flow curve of the shear viscosity (η) measured relative to the shear rate (γ) converted by the Cox-Mers rule for each frequency (rad/s). The zero-shear viscosity ($\eta_0$ (Pa·s)) was obtained as one of fitting parameters.

<Shape Retention Test>

The powder or pellets of the copolymer was compressively molded at 280° C., to obtain the sheet-like molded article having a thickness of 2.0 mm. The molded article obtained was cut into small pieces, and the obtained small pieces of 2 g were charged in a cylinder of the melt indexer (produced by Yasuda Seiki Seisakusho, Ltd.) and heated at 27000 for 5 minutes. With respect to the copolymer heated to 270° C., a small amount of the copolymer was flowed out of a nozzle by applying a load of 5 kg, to cut the copolymer flowed out. After that, in a state of no load, the copolymer was flowed out of the nozzle, to measure a mass (mg/10 minutes) of the copolymer flowed out per 10 minutes.

The copolymer of which the amount of flow out of the nozzle is little in the shape retention test, is excellent in that an extrudate (an extrudate until cooled to be hardened after extruded from a die) in an unhardened state is less likely to be deformed and easily molded into desired dimensions and shape, when the copolymer is melted in an extruder and extruded from the die, to make the extrudate.

<Haze Value>

The powder or pellets of the copolymer was compressively molded at 280° C., to obtain the sheet-like molded article having the thickness of 2.0 mm. Using a haze meter (Haze Gard II, produced by Toyo Seiki Seisaku-Sho, Ltd.), a haze value of the sheet-like molded article obtained was measured in accordance with ASTM D1003.

<Yellow Index (YI)>

The powder or pellets of the copolymer was compressively molded at 280° C., to obtain the sheet-like molded article having the thickness of 2.0 mm. Using a color difference meter ZE6000 (produced by Nippon Denshoku Kogyo Corporation), a yellow index value of the sheet-like molded article obtained was measured in accordance with ASTM D1925.

<Tensile Modulus of Elasticity and Tensile Elongation>

The powder or pellets of the copolymer was compressively molded at 280° C., to obtain the sheet-like molded article having a thickness of 1.5 mm. Test pieces were prepared by using a micro-dumbbell provided in ASTM D1708. Using Autograph (AGS-J, 5 kN, produced by Shimadzu Corporation), a tensile test was performed at 25° C. and a tensile speed of 50 mm/min in accordance with ASTM D1708, and a tensile modulus of elasticity and a tensile elongation of the dumbbell-shaped test piece obtained were measured.

Example 1

1.2 L of deionized water was put into a 4 L autoclave with a stirrer, and after the inside of the autoclave was thoroughly replaced with nitrogen, 900 g of HFP was added, and the inside of the system was heated to 35° C. with stirring at a stirring speed of 750 rpm. Next, 115 g of TFE and 2.5 g of Et were injected, and after that, 12.1 g of di-n-propylperoxydicarbonate was charged to start polymerization. Since the inside pressure of the system was reduced with progress of the polymerization, a mixed gas of TFE/Et/HFP=36.2/42.4/21.4 (molar ratio) was continuously supplied and the inside pressure of the system was held at 1.2 MPa, and stirring was continued for 13 hours and 40 minutes. Next, after releasing the pressure and returning the inside pressure of the system to atmospheric pressure, a reaction product was washed by water and dried, to prepare 230 g of powder of a copolymer. Using the powder of the copolymer, various physical properties of the copolymer were measured. The results are shown in Table 1.

Example 2

1.2 L of deionized water was put into a 4 L autoclave with a stirrer, and after the inside of the autoclave was thoroughly replaced with nitrogen, 900 g of HFP was added, and the inside of the system was heated to 35° C. with stirring at a stirring speed of 750 rpm. Next, 115 g of TFE and 2.5 g of Et were injected, and after that, 12.1 g of di-n-propylperoxydicarbonate was charged to start polymerization. Since the inside pressure of the system was reduced with progress of the polymerization, a mixed gas of TFE/Et/HFP=36.2/42.4/21.4 (molar ratio) was continuously supplied and the inside pressure of the system was held at 1.2 MPa, and stirring was continued for 12 hours. Next, after releasing the pressure and returning the inside pressure of the system to atmospheric pressure, a reaction product was washed by water and dried, to prepare 191 g of powder of a copolymer. Using the powder of the copolymer, various physical properties of the copolymer were measured. The results are shown in Table 1.

Example 3

1.2 L of deionized water was put into a 4 L autoclave with a stirrer, and after the inside of the autoclave was thoroughly replaced with nitrogen, 900 g of HFP was added, and the inside of the system was heated to 35° C. with stirring at a stirring speed of 750 rpm. Next, 115 g of TFE and 2.5 g of Et were injected, and after that, 12.1 g of di-n-propylperoxydicarbonate was charged to start polymerization. Since the inside pressure of the system was reduced with progress of the polymerization, a mixed gas of TFE/Et/HFP=36.2/42.4/21.4 (molar ratio) was continuously supplied and the inside pressure of the system was held at 1.2 MPa, and stirring was continued for 15 hours. Next, after releasing the pressure and returning the inside pressure of the system to atmospheric pressure, a reaction product was washed by water and dried, to prepare 270 g of powder of a copolymer. Using the powder of the copolymer, various physical properties of the copolymer were measured. The results are shown in Table 1.

Example 4

1.2 L of deionized water was put into a 4 L autoclave with a stirrer, and after the inside of the autoclave was thoroughly replaced with nitrogen, 900 g of HFP was added, and the inside of the system was heated to 35° C. with stirring at a stirring speed of 750 rpm. Next, 115 g of TFE and 2.5 g of Et were injected, and after that, 12.1 g of di-n-propylperoxydicarbonate was charged to start polymerization. Since the inside pressure of the system was reduced with progress of the polymerization, a mixed gas of TFE/Et/HFP=34.6/43.3/22.1 (molar ratio) was continuously supplied and the inside pressure of the system was held at 1.2 MPa, and stirring was continued for 10 hours and 30 minutes. Next, after releasing the pressure and returning the inside pressure of the system to atmospheric pressure, a reaction product was washed by water and dried, to prepare 165 g of powder of a copolymer. Using the powder of the copolymer, various physical properties of the copolymer were measured. The results are shown in Table 1.

Example 5

1.2 L of deionized water was put into a 4 L autoclave with a stirrer, and after the inside of the autoclave was thoroughly replaced with nitrogen, 900 g of HFP was added, and the inside of the system was heated to 35° C. with stirring at a stirring speed of 750 rpm. Next, 117 g of TFE and 1.9 g of Et were injected, and after that, 12.1 g of di-n-propylperoxydicarbonate was charged to start polymerization. Since the inside pressure of the system was reduced with progress of the polymerization, a mixed gas of TFE/Et/HFP=37.6/41.9/20.5 (molar ratio) was continuously supplied and the inside pressure of the system was held at 1.2 MPa, and stirring was continued for 12 hours and 30 minutes. Next, after releasing the pressure and returning the inside pressure of the system to atmospheric pressure, a reaction product was washed by water and dried, to prepare 220 g of powder of a copolymer. Using the powder of the copolymer, various physical properties of the copolymer were measured. The results are shown in Table 1.

Example 6

51.6 L of deionized water was put into a 175 L autoclave with a stirrer, and after the inside of the autoclave was thoroughly replaced with nitrogen, 40.2 kg of HFP was added, and the inside of the system was heated to 35° C. with stirring at a stirring speed of 220 rpm. Next, 5.7 kg of TFE and 183 g of Et were injected, and after that, 47 g of cyclohexane and 773 g of di-n-propylperoxydicarbonate were charged to start polymerization. Since the inside pressure of the system was reduced with progress of the polymerization, a mixed gas of TFE/Et/HFP=36.2/42.4/21.4 (molar ratio) was continuously supplied and the inside pressure of the system was held at 1.28 MPa, and stirring was continued for 30 hours and 30 minutes. Next, after releasing the pressure and returning the inside pressure of the system to atmospheric pressure, a reaction product was washed by water and dried, to prepare 32.2 kg of powder of a copolymer. Further, using a single screw extruder, the powder of the copolymer was extruded, to prepare pellets of the copolymer. Using the pellets of the copolymer, various physical properties of the copolymer were measured. The results are shown in Table 1.

Comparative Example 1

1.2 L of deionized water was put into a 4 L autoclave with a stirrer, and after the inside of the autoclave was thoroughly replaced with nitrogen, 900 g of HFP was added, and the inside of the system was heated to 35° C. with stirring at a stirring speed of 750 rpm. Next, 127 g of TFE and 2.0 g of Et were injected, and after that, 12.1 g of di-n-propylperoxydicarbonate was charged to start polymerization. Since the inside pressure of the system was reduced with progress of the polymerization, a mixed gas of TFE/Et/HFP=39.6/39.5/20.9 (molar ratio) was continuously supplied and the inside pressure of the system was held at 1.22 MPa, and stirring was continued for 14 hours and 45 minutes. Next, after releasing the pressure and returning the inside pressure of the system to atmospheric pressure, a reaction product was washed by water and dried, to prepare 265 g of powder of a copolymer. Using the powder of the copolymer, various physical properties of the copolymer were measured. The results are shown in Table 1.

Comparative Example 2

1.2 L of deionized water was put into a 4 L autoclave with a stirrer, and after the inside of the autoclave was thoroughly replaced with nitrogen, 900 g of HFP was added, and the inside of the system was heated to 35° C. with stirring at a stirring speed of 750 rpm. Next, 111 g of TFE and 1.1 g of Et were injected, and after that, 12.1 g of di-n-propylperoxydicarbonate was charged to start polymerization. Since the inside pressure of the system was reduced with progress of the polymerization, a mixed gas of TFE/Et/HFP=44.0/36.0/20.0 (molar ratio) was continuously supplied and the inside pressure of the system was held at 1.2 MPa, and stirring was continued for 17 hours and 40 minutes. Next, after releasing the pressure and returning the inside pressure of the system to atmospheric pressure, a reaction product was washed by water and dried, to prepare 294 g of powder of a copolymer. Using the powder of the copolymer, various physical properties of the copolymer were measured. The results are shown in Table 1.

Comparative Example 3

1.2 L of deionized water was put into a 4 L autoclave with a stirrer, and after the inside of the autoclave was thoroughly replaced with nitrogen, 840 g of HFP was added, and the inside of the system was heated to 35° C. with stirring at a stirring speed of 750 rpm. Next, 110 g of TFE and 5.5 g of Et were injected, and after that, 12.1 g of di-n-propylperoxydicarbonate was charged to start polymerization. Since the inside pressure of the system was reduced with progress of the polymerization, a mixed gas of TFE/Et/HFP=34.1/47.4/18.5 (molar ratio) was continuously supplied and the inside pressure of the system was held at 1.28 MPa, and stirring was continued for 10 hours and 30 minutes. Next, after releasing the pressure and returning the inside pressure of the system to atmospheric pressure, a reaction product was washed by water and dried, to prepare 141 g of powder of a copolymer. Using the powder of the copolymer, various physical properties of the copolymer were measured. The results are shown in Table 1.

Comparative Example 4

1.2 L of deionized water was put into a 4 L autoclave with a stirrer, and after the inside of the autoclave was thoroughly replaced with nitrogen, 320 g of perfluorocyclobutane, 610 g of HFP, and 0.303 g of cyclohexane were added, and the inside of the system was heated to 35° C. with stirring at a stirring speed of 750 rpm. Next, 128 g of TFE and 4.7 g of Et were injected, and after that, 24.2 g of di-n-propylperoxydicarbonate was charged to start polymerization. Since the inside pressure of the system was reduced with progress of the polymerization, a mixed gas of TFE/Et/HFP=40.9/44.6/14.5 (molar ratio) was continuously supplied and the inside pressure of the system was held at 1.15 MPa, and stirring was continued for 5 hours and 20 minutes. Next, after releasing the pressure and returning the inside pressure of the system to atmospheric pressure, a reaction product was washed by water and dried, to prepare 165 g of powder of a copolymer. Using the powder of the copolymer, various physical properties of the copolymer were measured. The results are shown in Table 1.

Comparative Example 5

Powder of a copolymer was prepared in the same manner as Comparative Example 4 except that the amount of di-n-propylperoxydicarbonate charged was changed to 12.1 g. Stirring was continued for 6 hours, to prepare 165 g of powder of a copolymer. Various physical properties of the copolymer were measured. The results are shown in Table 1.

Comparative Example 6

1.2 L of deionized water was put into a 4 L autoclave with a stirrer, and after the inside of the autoclave was thoroughly replaced with nitrogen, 900 g of HFP was added, and the inside of the system was heated to 35° C. with stirring at a stirring speed of 750 rpm. Next, 90 g of TFE and 3.8 g of Et were injected, and after that, 12.1 g of di-n-propylperoxydicarbonate was charged to start polymerization. Since the inside pressure of the system was reduced with progress of the polymerization, a mixed gas of TFE/Et/HFP=31.8/43.4/24.8 (molar ratio) was continuously supplied and the inside pressure of the system was held at 1.15 MPa, and stirring was continued for 12 hours and 30 minutes. Next, after releasing the pressure and returning the inside pressure of the system to atmospheric pressure, a reaction product was washed by water and dried, to prepare 155 g of powder of a copolymer. Using the powder of the copolymer, various physical properties of the copolymer were measured. The results are shown in Table 1.

As the results of Table 1 showed, in the copolymer of each example which consisted essentially of the Et units, the TFE units, and the HFP units, and contents of these 3 types of the monomer units were properly adjusted, an amount of the copolymer flowed out of the nozzle in the state of no load was small in the shape retention test. Therefore, by using the copolymer of each example, the molded article having the desired dimensions and shape could be easily obtained. Also, the molded article obtained from the copolymer of each example had the low haze value and yellow index, the high tensile modulus of elasticity, and the large tensile elongation.

For example, checking the haze values, though the copolymer of Example 3 was equivalent to the copolymer of Comparative Example 5 in the shear viscosity ($\eta_{100}$), the molded article obtained from the copolymer of Example 3 had a lower haze value than that of the molded article obtained from the copolymer of Comparative Example 5. As clear from a comparison between Comparative Example 4 and Comparative Example 5, since it was observed that the haze value of the molded article tended to become lower as the shear viscosity ($\eta_{100}$) of the copolymer became larger, it is speculated that a superior effect of the low haze value of the molded article was due to appropriate adjustment of the contents of the 3 types of the monomer units, even though the shear viscosity ($\eta_{100}$) of the copolymer was equivalent.

Further, checking the results of the shape retention test, though the copolymer of Example 3 was equivalent to the copolymer of Comparative Example 5 in the shear viscosity ($\eta_{100}$), the copolymer of Example 3 had a smaller amount of the copolymer flowed out of the nozzle in the state of no load than that of the copolymer of Comparative Example 5. Similarly, though the copolymer of Example 2 was equivalent to the copolymer of Comparative Example 4 in the shear viscosity ($\eta_{100}$), the copolymer of Example 2 had a smaller amount of the copolymer flowed out of the nozzle in the state of no load than that of the copolymer of Comparative Example 5. For example, as clear from a comparison between Comparative Example 4 and Comparative Example 5, when only shear viscosity ($\eta_{100}$) of the copolymer was reduced, an amount of the copolymer flowed out of the nozzle in the no loading state became very large. Accord-

TABLE 1

| | Et/TFE Molar Ratio | HFP (mol %) | MFR (g/10 min) | Melting Point (° C.) | $\eta_0$ (Pa · s) | $\eta_{100}$ (Pa · s) | $\eta_0/\eta_{100}$ | Shape Retention Test Amount of Flow Out (mg/10 min) | Haze Value (%) | YI | Tensile Modulus of Elasticity (MPa) | Tensile Elongation (%) |
|---|---|---|---|---|---|---|---|---|---|---|---|---|
| Example 1 | 54.9/45.1 | 19.8 | 26 | 112.4 | 1898 | 340 | 5.6 | 7.2 | 8 | −15 | 491 | 482 |
| Example 2 | 54.3/45.7 | 20.0 | 46 | 114.2 | 1040 | 200 | 5.2 | 14.0 | 10 | −15 | 432 | 449 |
| Example 3 | 54.9/45.1 | 20.4 | 18 | 111.1 | 2400 | 450 | 5.3 | 5.8 | 6 | −18 | 458 | 523 |
| Example 4 | 55.6/44.4 | 20.6 | 61 | 115.2 | 986 | 170 | 5.8 | 14.7 | 7 | −16 | 412 | 458 |
| Example 5 | 52.7/47.3 | 19.3 | 32 | 121.6 | 1534 | 300 | 5.1 | 10.2 | 11 | −18 | 374 | 513 |
| Example 6 | 54.9/45.1 | 20.3 | 34 | 113.1 | 1420 | 300 | 4.7 | 8.0 | 8 | −15 | 450 | 480 |
| Comparative Example 1 | 49.3/50.7 | 18.4 | 54 | 124.6 | 850 | 230 | 3.7 | 16.2 | 16 | −43 | 172 | 588 |
| Comparative Example 2 | 46.5/53.5 | 18.1 | 98 | 123.5 | 430 | 110 | 3.9 | 24.2 | 23 | −73 | 83 | 532 |
| Comparative Example 3 | 58.2/41.8 | 21.0 | 27 | 120.5 | 2500 | 400 | 6.3 | 5.2 | 6 | −6 | 531 | 391 |
| Comparative Example 4 | 52.3/47.7 | 14.3 | 120 | 156.3 | 388 | 195 | 2.0 | 83.8 | 18 | −69 | 470 | 498 |
| Comparative Example 5 | 52.2/47.8 | 14.0 | 36 | 161.5 | 1023 | 460 | 2.2 | 8.3 | 13 | −47 | 442 | 452 |
| Comparative Example 6 | 58.0/42.0 | 24.0 | 24 | 128.2 | 3000 | 430 | 7.0 | 4.3 | 4 | −7 | 246 | 420 | ingly, it is speculated that superior effect that the amount of copolymer flowed out of the nozzle in the no loading state was small, was due to appropriate adjustment of the contents of the 3 types of the monomer units, even though the shear viscosity ($\eta_{100}$) of the copolymer was equivalent.

The invention claimed is:

1. A copolymer consisting essentially of ethylene units, tetrafluoroethylene units, and hexafluoropropylene units,
   wherein a molar ratio (Et units/TFE units) of the ethylene (Et) units to the tetrafluoroethylene (TEE) units is 52.0/48.0 to 56.0/44.0, and
   a content of the hexafluoropropylene units is 19.0 to 21.0 mol % based on the total monomer units constituting the copolymer.

2. The copolymer according to claim 1, wherein a ratio ($\eta_0/\eta_{100}$) of zero-shear viscosity ($\eta_0$ (Pa·s)) to shear viscosity ($\eta_{100}$ (Pa·s)) is 4.0 or more,
   wherein the zero-shear viscosity ($\eta_0$ (Pa·s)) is determined by fitting, using Cross-WLF model, a flow curve of the shear viscosity of the copolymer relative to the shear rate at a measurement temperature of 270° C., and
   the shear viscosity ($\eta_{100}$ (Pa·s)) represents a shear viscosity of the copolymer at a measurement temperature of 270° C. and a shear rate of 100 (1/s).

3. The copolymer according to claim 1, wherein the shear viscosity ($\eta_{100}$ (Pa·s)) at a measurement temperature of 270° C. and a shear rate of 100 (1/s) is 100 to 500 Pa·s.

4. The copolymer according to claim 1, wherein a melt flow rate at a measurement temperature of 265° C. and a load of 5 kg is 1 to 80 g/10 minutes.

5. The copolymer according to claim 1, wherein a melting point is 135° C. or less.

6. The copolymer according to claim 1, wherein a tensile modulus of elasticity is 250 MPa or more.

* * * * *